(12) United States Patent
Fukuda et al.

(10) Patent No.: US 11,303,178 B2
(45) Date of Patent: Apr. 12, 2022

(54) STATOR FOR ROTARY ELECTRIC MACHINE, METHOD OF MANUFACTURING STATOR FOR ROTARY ELECTRIC MACHINE, AND ROTARY ELECTRIC MACHINE

(71) Applicant: Hitachi Automotive Systems, Ltd., Hitachinaka (JP)

(72) Inventors: Tomohiro Fukuda, Hitachinaka (JP);
Satoshi Yamamura, Hitachinaka (JP);
Yousuke Umesaki, Hitachinaka (JP);
Tomohiro Adachi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 607 days.

(21) Appl. No.: 16/319,644

(22) PCT Filed: Jul. 20, 2017

(86) PCT No.: PCT/JP2017/026240
§ 371 (c)(1),
(2) Date: Jan. 22, 2019

(87) PCT Pub. No.: WO2018/055895
PCT Pub. Date: Mar. 29, 2018

(65) Prior Publication Data
US 2021/0288543 A1 Sep. 16, 2021

(30) Foreign Application Priority Data

Sep. 26, 2016 (JP) .............................. JP2016-187328

(51) Int. Cl.
*H02K 3/34* (2006.01)
*H02K 15/10* (2006.01)

(52) U.S. Cl.
CPC ........... *H02K 3/345* (2013.01); *H02K 15/105* (2013.01)

(58) Field of Classification Search
CPC .............. H02K 3/32; H02K 3/34; H02K 3/345
See application file for complete search history.

(56) References Cited

U.S. PATENT DOCUMENTS 4,160,926 A * 7/1979 Cope ...................... H02K 3/345
174/11 ON
2005/0168097 A1 8/2005 Takizawa et al.
(Continued)

FOREIGN PATENT DOCUMENTS

CN 1649238 A 8/2005
CN 102208838 A 10/2011
(Continued)

OTHER PUBLICATIONS

Machine translation of EP 2677633 A1 (Year 2013).*
(Continued)

*Primary Examiner* — Quyen P Leung
*Assistant Examiner* — Minki Chang
(74) *Attorney, Agent, or Firm* — Crowell & Moring LLP

(57) ABSTRACT

The object of the invention is to improve operability of the process for inserting the coil conductor into the insulating member stored inside the slot of the rotor core. Each of the first insulating member and the second insulating member has one side arranged between the first coil and the second coil so that the respective sides are superposed along the radial direction of the stator core. The side of the first insulating member and the side of the second insulating member are connected with the first connection part at one end in the longitudinal direction.

10 Claims, 21 Drawing Sheets

(56) References Cited

U.S. PATENT DOCUMENTS

2011/0204742 A1* 8/2011 Nakayama ............ H02K 3/345
                                                                                                  310/215
2011/0241474 A1   10/2011  Fukunaga et al.
2015/0280508 A1   10/2015  Hirota et al.

FOREIGN PATENT DOCUMENTS

| CN | 103618395 A | 3/2014 | |
|----|-------------|--------|---|
| CN | 104782028 A | 7/2015 | |
| EP | 2677633 A1 * | 12/2013 | ............ H02K 9/22 |
| JP | 55-113212 A | 9/1980 | |
| JP | 2007-124821 A | 5/2007 | |
| JP | 2010-93879 A | 4/2010 | |
| JP | 2012-161148 A | 8/2012 | |
| JP | 2012-222983 A | 11/2012 | |

OTHER PUBLICATIONS

International Search Report (PCT/ISA/210) issued in PCT Application No. PCT/JP2017/026240 dated Oct. 24, 2017 with English translation (five (5) pages).
Japanese-language Written Opinion (PCT/ISA/237) issued in PCT Application No. PCT/JP2017/026240 dated Oct. 24, 2017 (three (3) pages).
Chinese-language Office Action issued in Chinese Application No. 201780045062.6 dated Mar. 20, 2020 with English translation (13 pages).

* cited by examiner

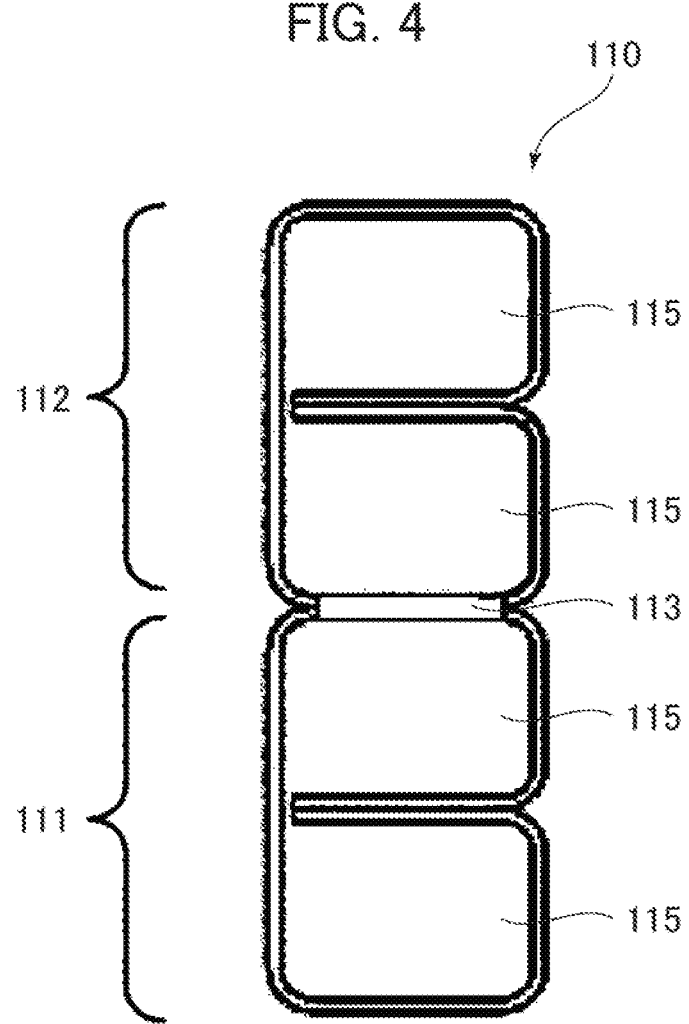

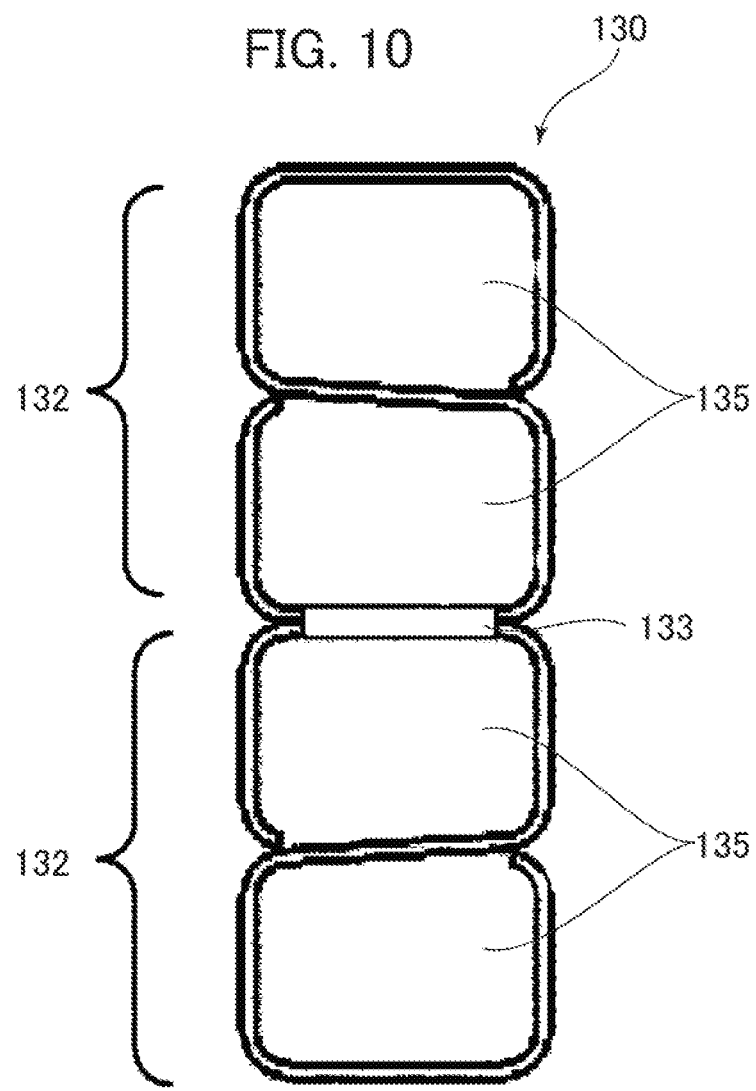

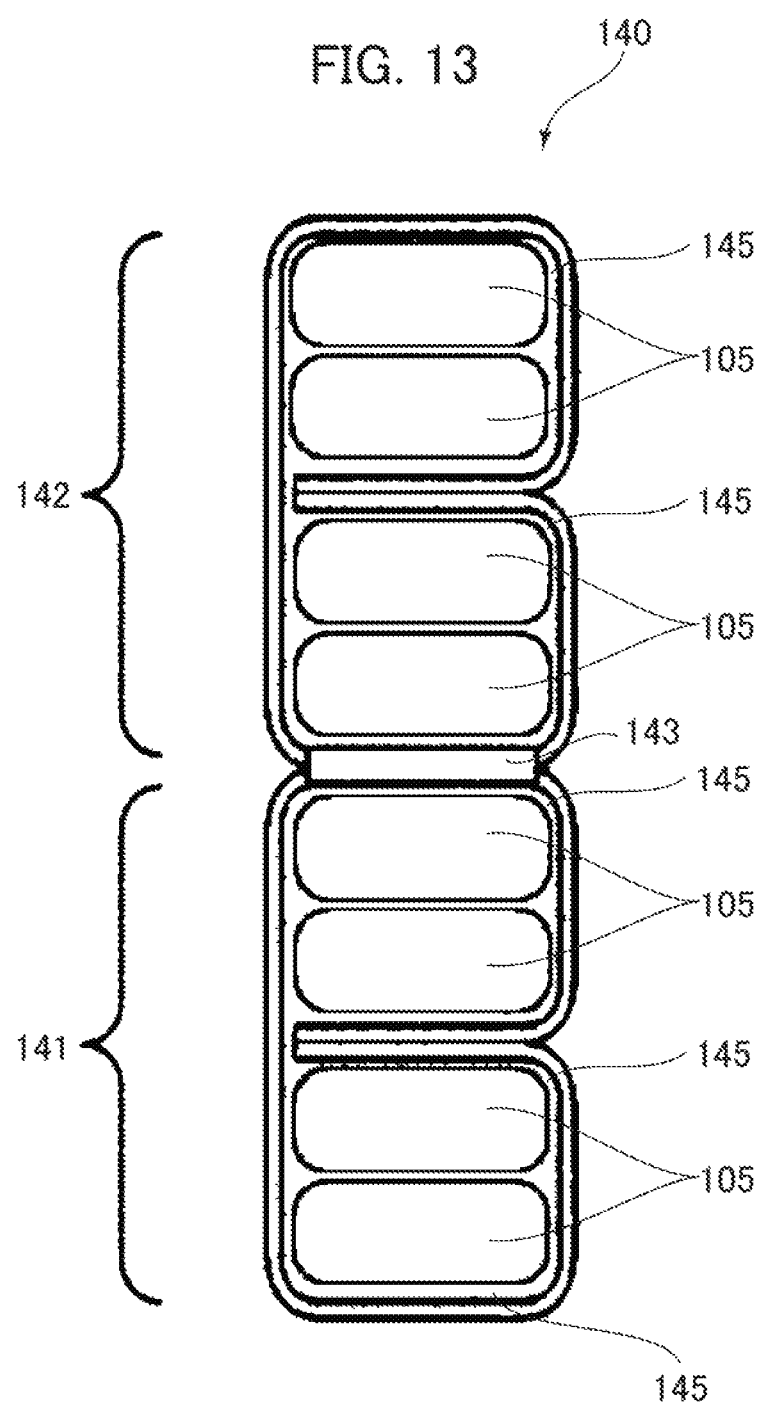

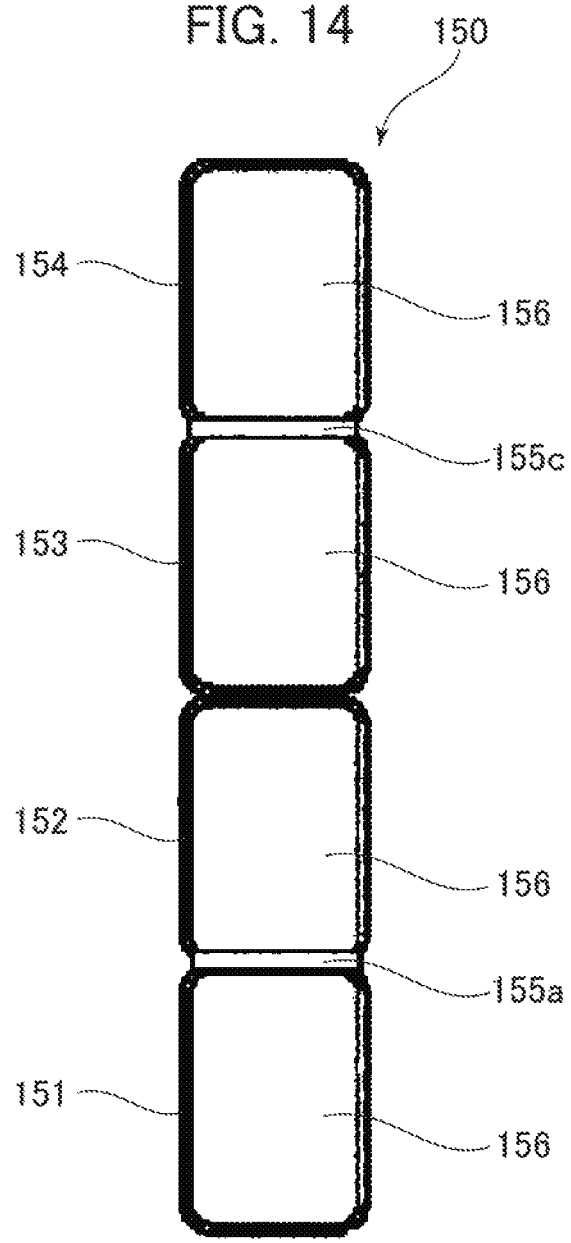

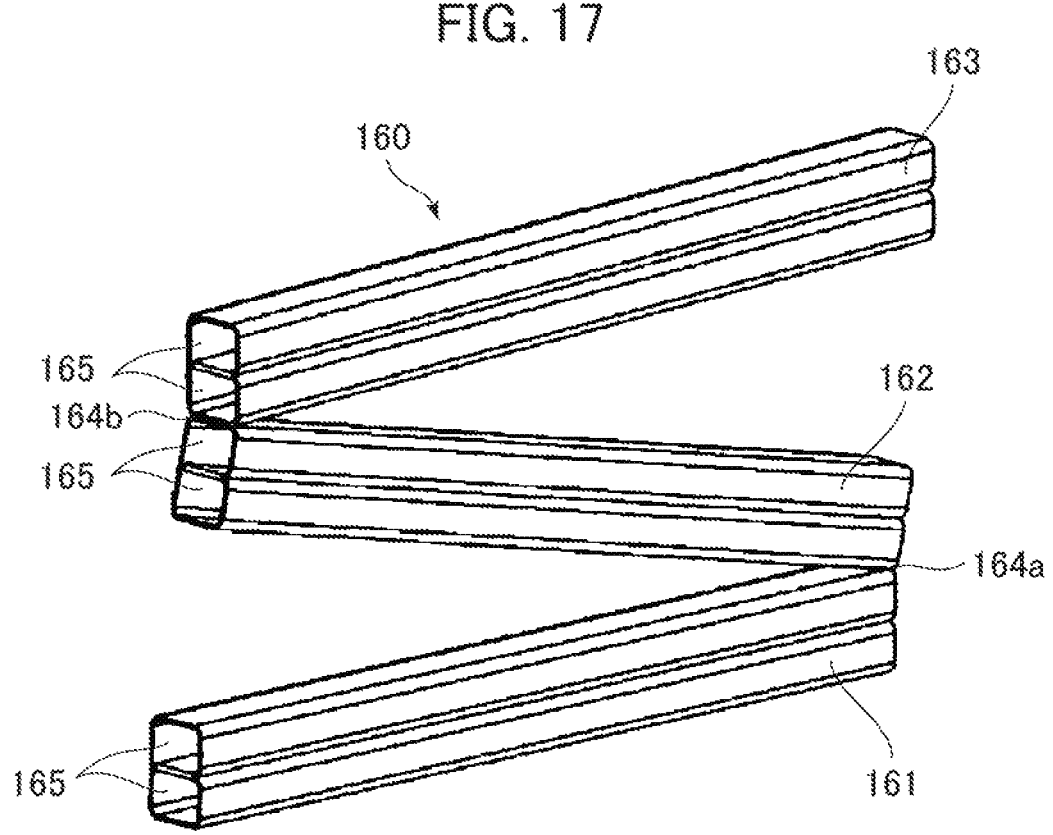

STATOR FOR ROTARY ELECTRIC MACHINE, METHOD OF MANUFACTURING STATOR FOR ROTARY ELECTRIC MACHINE, AND ROTARY ELECTRIC MACHINE

TECHNICAL FIELD

The present invention relates to a stator for rotary electric machine, a method of manufacturing stator for rotary electric machine, and a rotary electric machine.

BACKGROUND ART

A rotary electric machine includes a stator and a rotor which are stored in a casing. The stator for the rotary electric machine includes a cylindrical stator core, and stator windings of U-phase, V-phase, W-phase, which are inserted into a plurality of slots formed in the inner circumferential side of the stator core. Each of the stator windings includes a plurality of coil conductors inserted into the respective slots. The coil conductor inserted into the slot is insulated from the other coil conductor or from the stator core by an insulating member which is formed from the sheet-like insulating paper, and stored in the slot.

The insulating member is formed into a tubular shape to surround the coil conductor for the purpose of insulation between the coil conductors, and between the coil conductor and the stator core. The insulating member is preliminarily shaped in accordance with the slot, for example, or bent into the tubular shape while being stored in the slot (for example, see Patent Literature 1).

CITATION LIST

Patent Literature

Patent Literature 1: Japanese Unexamined Patent Application Publication No. 2012-222983

SUMMARY OF INVENTION

Technical Problem

The insulating members of the stator for rotary electric machine as disclosed in Patent Literature 1 are stored independently in the respective slots one by one, that is, they are stored separately from one another. Accordingly, when inserting the coil conductor, the insulating member tends to be positionally displaced, or slipped off accompanied with movement of the coil conductor, resulting in deteriorated operability.

Solution to Problem

According to an embodiment of the present invention, a stator for rotary electric machine includes a stator core which includes a plurality of slots, a first coil and a second coil which are arranged inside the same slot along a radial direction of the stator core, and an insulating member which is stored inside the slot for insulation between the first coil and the second coil. The insulating member includes a first insulating member which surrounds the first coil, and a second insulating member which surrounds the second coil. Each of the first insulating member and the second insulating member has one side which is disposed between the first coil and the second coil, and both the one sides are superposed along the radial direction of the stator core. The one side of the first insulating member and the one side of the second insulating member are connected with a first connection part at one edge in a longitudinal direction.

Another embodiment of the present invention provides a manufacturing method of stator for rotary electric machine, which includes a first coil and a second coil which are arranged inside the same slot of a stator core along a radial direction of the stator core, and an insulating member which is stored inside the slot for insulation between the first coil and the second coil. The manufacturing method includes a first step for forming the insulating member with a tubular body for surrounding the first coil and the second coil, a second step for cutting the insulating member at a midpoint in a longitudinal direction of the tubular body to form a first tubular body surrounding the first coil and a second tubular body surrounding the second coil separately, while being connected with a connection part as a part of the tubular body, a third step for bending the insulating member at the connection part so that radially confronting sides of the first tubular body and the second tubular body of the insulating member are superposed, and a fourth step for disposing the first coil and the second coil in the first tubular body and the second tubular body of the insulating member, respectively.

Another embodiment of the present invention provides a manufacturing method of stator for rotary electric machine, which includes a first coil and a second coil which are arranged inside the same slot of a stator core along a radial direction of the stator core, and an insulating member which is stored inside the slot for insulation between the first coil and the second coil. The manufacturing method includes a first step for cutting the insulating member at a midpoint in a longitudinal direction to form a first tubular forming region surrounding the first coil and a second tubular forming region surrounding the second coil separately, while being connected with a connection part as a part of the insulating member, a second step for forming the first tubular forming region and the second tubular forming region of the insulating member into a first tubular body surrounding the first coil and a second tubular body surrounding the second coil, respectively, a third step for bending the insulating member at the connection part so that mutually confronting sides of the first tubular body and the second tubular body of the insulating member are superposed, and a fourth step for disposing the first coil and the second coil in the first tubular body and the second tubular body of the insulating member, respectively.

Advantageous Effects of Invention

The present invention ensures to improve operability of the process for inserting the coil.

BRIEF DESCRIPTION OF DRAWINGS

FIG. 4 is a front view of an insulating member as a first embodiment, disposed in the slot of the stator core according to the present invention.

FIG. 10 is a front view of the insulating member as a third embodiment, disposed in the slot of the stator core according to the present invention.

FIG. 13 is a front view of the insulating member as a fourth embodiment, disposed in the slot of the stator core according to the present invention.

FIG. 14 is a front view of the insulating member as a fifth embodiment, disposed in the slot of the stator core according to the present invention.

FIG. 17 is a perspective view of the insulating member as a sixth embodiment, disposed in the slot of the stator core according to the present invention.

FIG. 18 represents another method of manufacturing the insulating member as a seventh embodiment, disposed in the slot of the stator core according to the present invention, wherein

DESCRIPTION OF EMBODIMENTS

Figure 1:
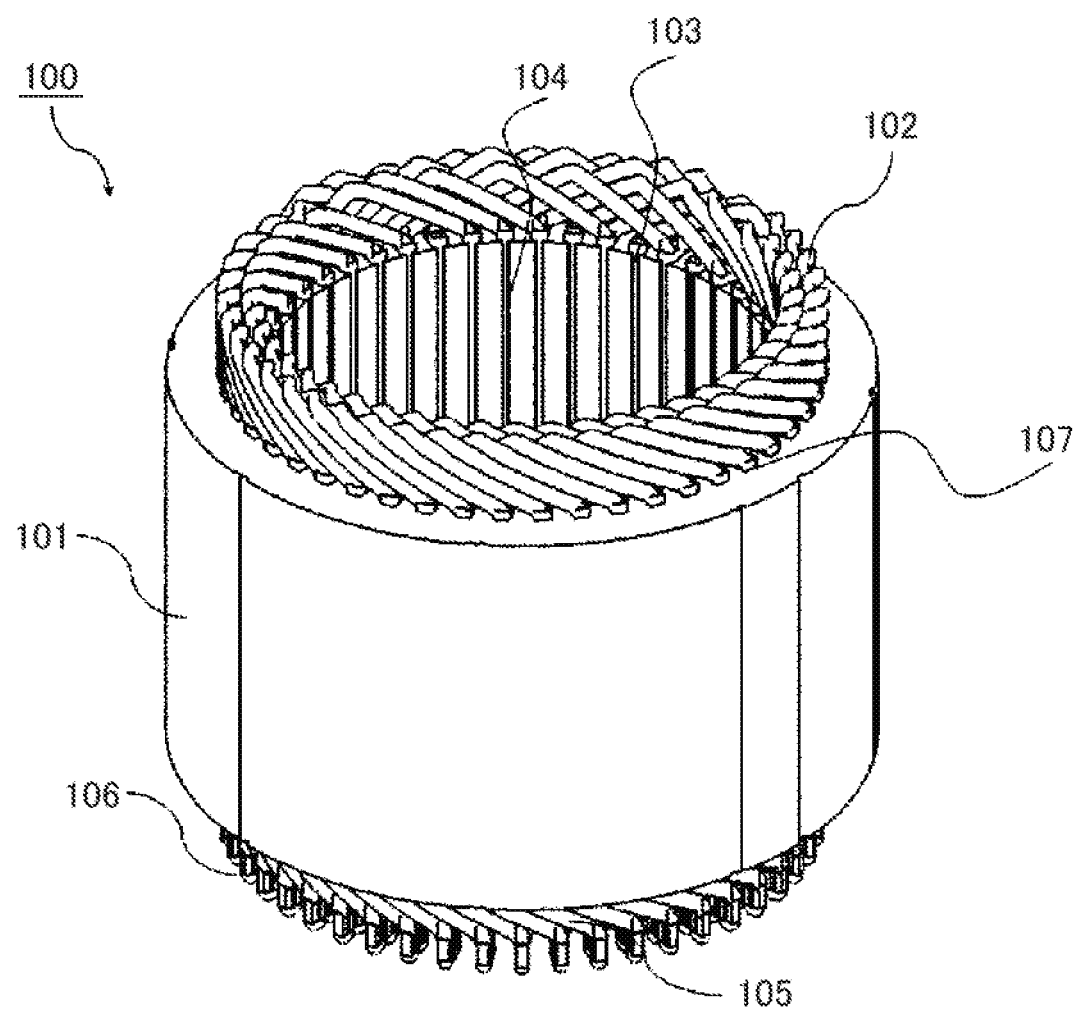
FIG. 1 is a perspective view of a stator for rotary electric machine according to an embodiment of the present invention.

An embodiment of the present invention will be described in reference to a rotary electric machine for a hybrid electric vehicle as an example. In the explanations below, the "axial direction" denotes the direction along the rotary axis of the rotary electric machine. The circumferential direction denotes the direction along the rotating direction of the rotary electric machine. The "radial direction" denotes the radius direction while having the rotary axis of the rotary electric machine as the center. The "inner circumferential side" denotes the inner side in the radial direction (internal diameter side), and the "outer circumferential side" denotes the opposite direction, that is, the outer side in the radial direction (external diameter side).

The embodiment will be briefly described hereinafter.

The embodiment described herein relates to the structure of the insulating member of the stator for the rotary electric machine.

The rotary electric machine is mainly constituted by a cylindrical stator, and a rotor disposed while being separated from the stator at a predetermined interval at the inner circumferential side.

The stator includes a plurality of magnetic poles which are arranged so that the adjacent magnetic polarities become different alternately in the rotating direction. The stator includes a cylindrical stator core, and a plurality of stator coils wound around the stator core. A plurality of slots arranged in the circumferential direction are formed in the inner circumferential side of the stator core. Each slot is formed in a penetration state in the axial direction of the stator core.

The stator coils extend inside the corresponding slots in the axial direction, and further extend over a plurality of slots separated at predetermined circumferential pitches corresponded to the magnetic poles by the lead-out line drawn out from each one end of the slots in the axial direction. The insulating members are stored in the respective slots for storing the stator coils. The insulating member includes a tubular member which surrounds the outer circumference of the stator coil for insulation between the stator coils, and between the stator coil and the stator core.

According to an embodiment of the present invention, the single sheet of insulating paper is folded back at the longitudinal midpoint in the axial direction so as to contiguously form the insulating members to be inserted into the adjacent slots. The insulating member is disposed inside the circumferentially adjacent slots, in the state where the folded-back part, that is, the connection part is exposed at one end of the slot. The tubular member and the folded-back part are formed by shaping the single sheet of insulating paper. Accordingly, it is possible to form the insulating member with the folded-back part efficiently at low costs. The insulating member has the folded-back part while keeping a gap at the inner side under the restoring force after the shaping. Then the edge of the insulating member at which the folded-back part is formed in the axial direction applies pressure to an inner wall surface at both radial sides of the slots of the stator core. Specifically, the insulating member is stored in the state where pressure is applied to the inner wall surface of the slot of the stator core at both radial sides under the elastic force of the folded-back part. In other words, the insulating member is held with the stator core under the elastic force of the folded-back part. It is therefore possible to suppress positional displacement and slipping off of the insulating member upon insertion of the stator coil into the slot of the stator core accompanied with movement of the coil conductor. This makes it possible to improve the operation efficiency.

First Embodiment

A first embodiment according to the present invention will be described referring to FIGS. 1 to 6.

Figure 2:
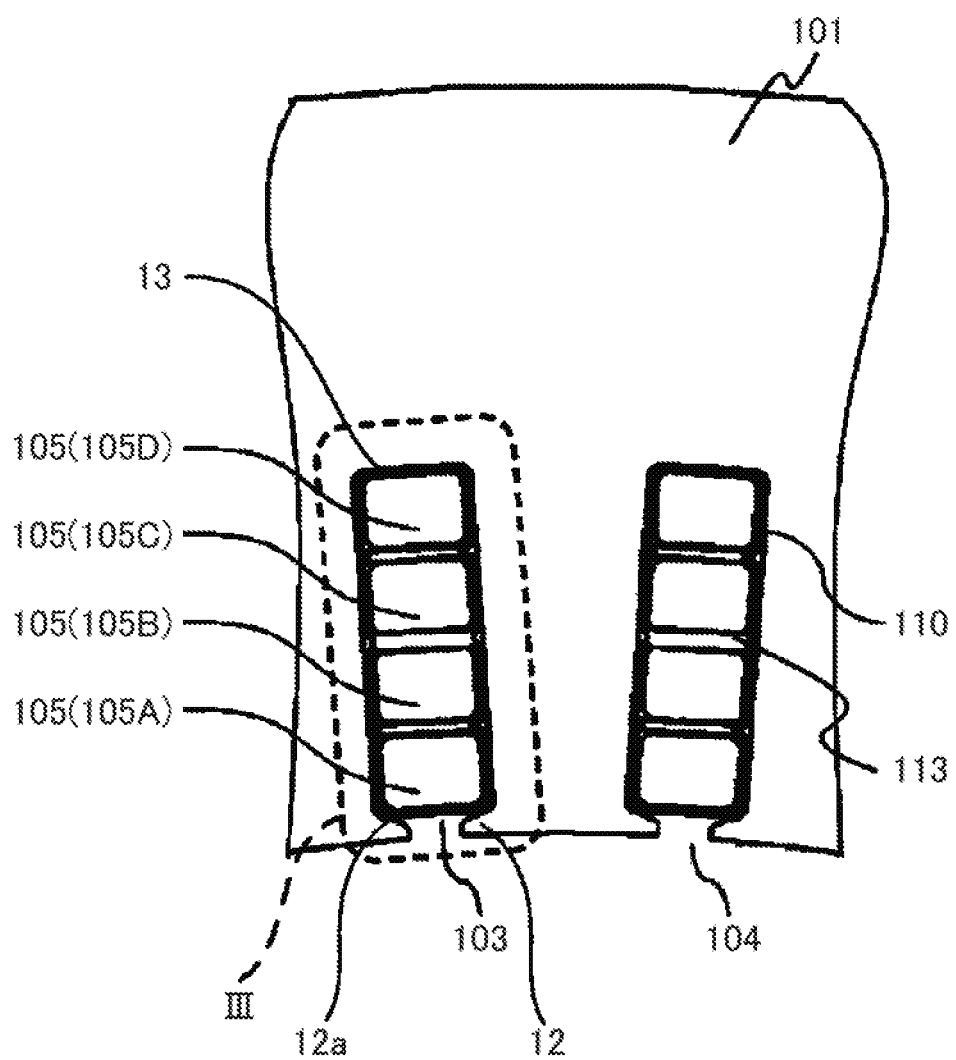
FIG. 2 is an enlarged plan view showing a part of a stator core near a slot as shown in FIG. 1.

FIG. 1 is a perspective view of a stator for rotary electric machine according to an embodiment of the present invention. FIG. 2 is an enlarged plan view of an area around a slot of a stator core as shown in FIG. 1.

A stator 100 includes a stator core (also referred to as a stator iron core) 101 having a plurality of slots 103 formed in an inner circumferential side, and three stator windings 102 corresponding to U-phase, V-phase, W-phase, respectively, which are wound around the stator core 101. The slots 103 are arranged at a predetermined circumferential pitch while being in arrangement equally spaced in the circumferential direction. Each of the slots 103 is formed to pierce through the stator core 101 in the axial direction. The slot 103 includes a slit 104 which is opened at the inner circumferential side of the stator core 101. The slit 104 is formed parallel to the corresponding slot 103 along the whole axial length of the stator core 101.

Each of the stator windings 102 according to the embodiment is constituted by a plurality of coil conductors 105 each having an insulating film applied to its outer circumferential surface. Each of the coil conductors 105 is inserted into the slot 103. A plurality of coil conductors 105 (four in the embodiment) are inserted into the slot 103. The radially adjacent coil conductors 105 have the respective ends (lower ends as shown in FIG. 1) in the axial direction of the stator core 101 welded at a welding section 106 inside the same slot 103. Each of the coil conductors 105 is bent into a U-like shape at the other end (upper end as shown in FIG. 1) of the stator core 101 in the axial direction. In other words, each of the respective coil conductors 105 is formed into the U-like shape connected to the other coil conductor 105 at the other end. The other U-like connected coil conductor 105 of the pair is inserted into another slot 103. The other coil conductor 105 inserted into another slot 103 is welded to the other radially adjacent coil conductor 105 at the welding section 106 inside the slot 103 at one end of the stator core 101 in the axial direction.

As described above, the long stator winding 102 is formed while having the coil conductors 105 electrically coupled at the welding section 106. The coil conductor 105 has its part at the side of the welding section 106 protruded outwardly in the axial direction of the slot 103, and the insulating film applied to the peripheral edge of the welding section 106 over the whole circumference is peeled off.

The insulating member 110 made of the electrically insulating material is inserted into each of the slots 103. The insulating member 110 insulates the coil conductor 105 inserted into the slot 103 from the stator core 101.

Figure 3:
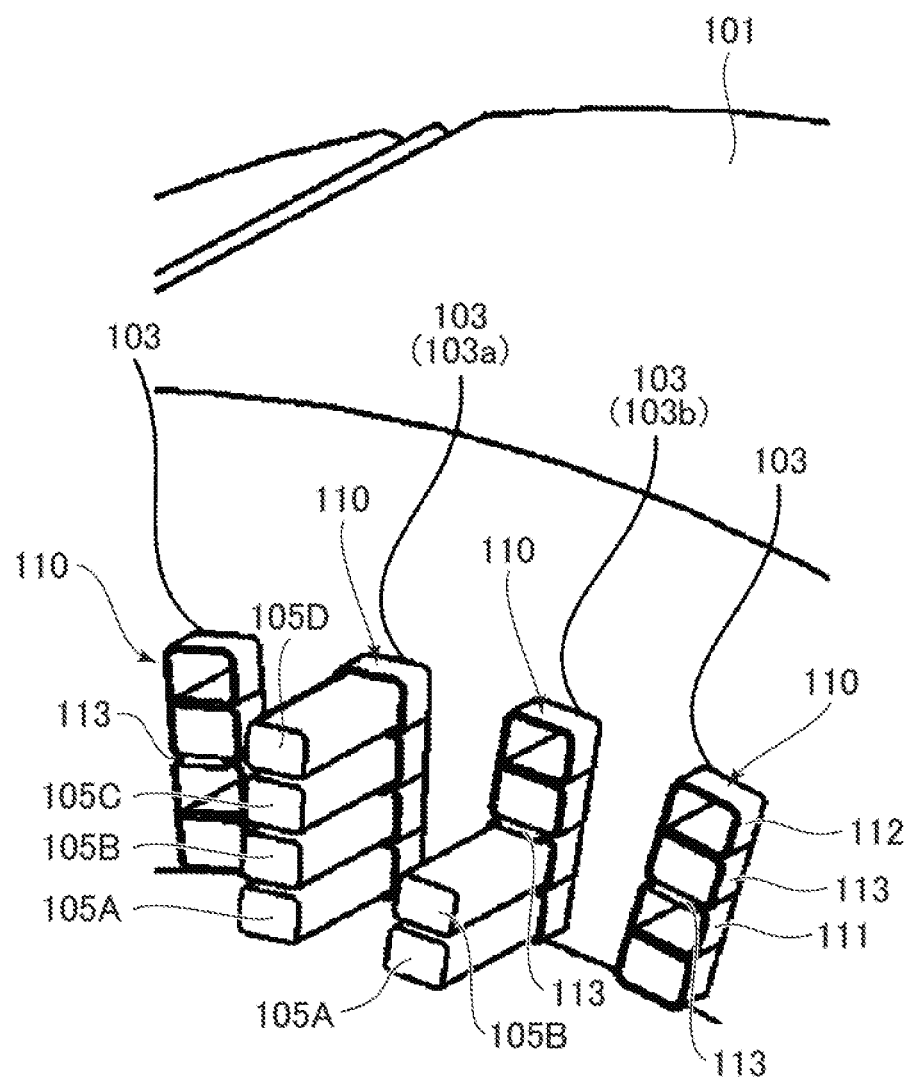
FIG. 3 is an enlarged perspective view showing a region III of a stator as shown in FIG. 2.

FIG. 3 is an enlarged perspective view of the region III of the stator as shown in FIG. 2. FIG. 3 represents the state where coil conductors 105A to 105D are inserted into a slot 103a as the second slot from the left, the coil conductors 105A, 105B are inserted into a slot 103b as the third slot from the left, and the coil conductor 105 is not inserted into the other slot 103.

The insulating members 110 are inserted into the respective slots 103 along the radial direction. The axial length of the insulating member 110 is larger than the axial length of the stator core 101, that is, the axial length of the slot 103. One end of the insulating member 110 protrudes outwardly from one end surface of the stator core 101. Similarly, although not shown, the other end of the insulating member 110 protrudes outwardly from the other end surface of the stator core 101.

FIG. 4 is a front view of the insulating member as a first embodiment, disposed inside the slot of the stator core according to the present invention.

The insulating member 110 includes a first insulating member 111, a second insulating member 112, and a connection part 113 for connection between the first insulating member 111 and the second insulating member 112. Each of the first insulating member 111 and the second insulating member 112 is formed into a tubular shape with a B-like cross section. The upper side of the first insulating member 111 and the lower side of the second insulating member 112 are superposed in the radial direction while being integrally connected with the connection part 113 at one end side in the longitudinal direction. The method of manufacturing the insulating member 110 will be described later. The first insulating member 111, the second insulating member 112 and the connection part 113 are integrally and contiguously shaped from the single sheet of insulating paper 110A (see FIG. 5(A)).

Each of the first insulating member 111 and the second insulating member 112 has two coil storage spaces 115 each surrounding the coil conductors 105. The four coil storage spaces 115 of the insulating member 110 are superposedly arranged in the radial direction.

The coil conductors 105A, 105B are respectively disposed inside the two coil storage spaces 115 of the first insulating member 111 disposed at the inner circumferential side of the stator core 101. The coil conductors 105C, 105D are respectively disposed inside the two coil storage spaces 115 of the second insulating member 112 disposed at the outer circumferential side of the stator core 101. As described above, the coil conductors 105A, 105B, and 105C, 105D have their leading ends welded, respectively.

The embodiment exemplifies the coil conductor 105 as the member having a rectangular cross section.

The connection part 113 of the insulating member 110 is disposed between the coil conductor 105B disposed inside the coil storage space 115 of the first insulating member 111 at the outer circumferential side in the radial direction, and the coil conductor 105C disposed inside the coil storage space 115 of the second insulating member 112 at the inner circumferential side in the radial direction.

FIGS. 5(A) to 5(D), and FIGS. 6(A) to 6(C) are perspective views representing the respective steps of the method of manufacturing the insulating member.

Figure 5A:
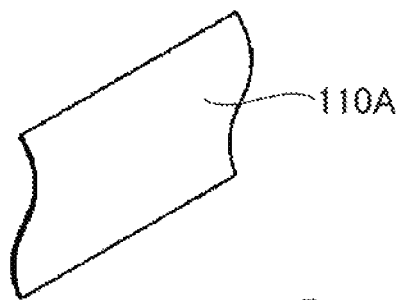
FIGS. 5A to 5D are perspective views representing steps of a method of manufacturing the insulating member as shown in FIG. 4.

As FIG. 5(A) shows, the single sheet of insulating paper 110A is prepared. The insulating paper 110A has the length equivalent to the total length of the first insulating member 111 and the second insulating member 112, and the width equivalent to the total of the outer peripheries of the first insulating member 111 and the second insulating member 112.

Figure 5B:
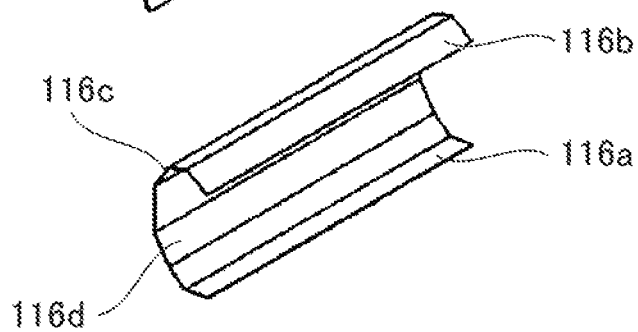
Figure 5C:
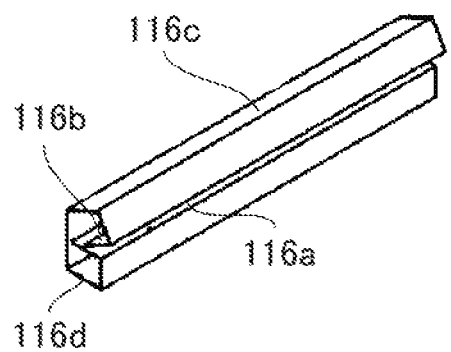
Figure 5D:
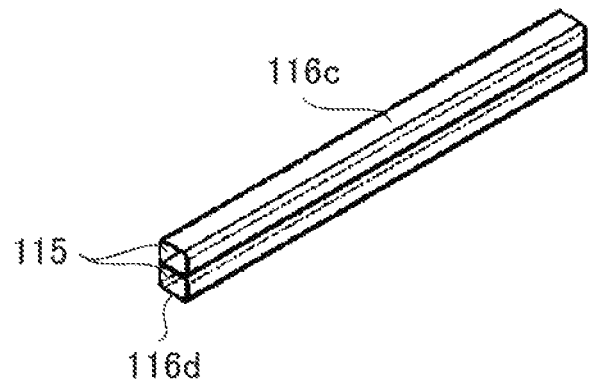

As FIGS. 5(B) to 5(D) show, the insulating paper 110A is folded six times parallel to the longitudinal direction to shape the tubular member with the B-like cross section. In this case, as FIG. 5(C) shows, the insulating paper 110A is folded so that both sides 116a, 116b in the width direction are superposed at a midpoint (the center horizontal line among the three horizontal lines of the B-like cross section) between the upper side 116c and the lower side 116d. As a result, the insulating paper 110A is formed into a tubular shape having two coil storage spaces 115, and its length equivalent to the total length of the first insulating member 111 and the second insulating member 112.

The sides 116a and 116b of the insulating paper 110A do not have to be bonded together.

Figure 6A:
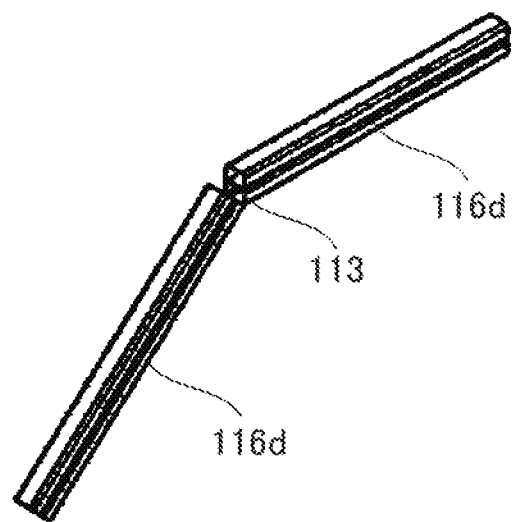
FIGS. 6A to 6C are perspective views of the insulating member in the steps subsequent to those shown in FIG. 5.

The insulating paper 110A is formed into the tubular shape with B-like cross section as shown in FIG. 5(D). In the above-described state, all the sides of the tubular body except the lower (or upper) side 116d are cut in the width direction at the longitudinal center position as shown in FIG. 6(A), forming the first insulating member 111 and the second insulating member 112 separately while being connected with the connection part 113.

Figure 6B:
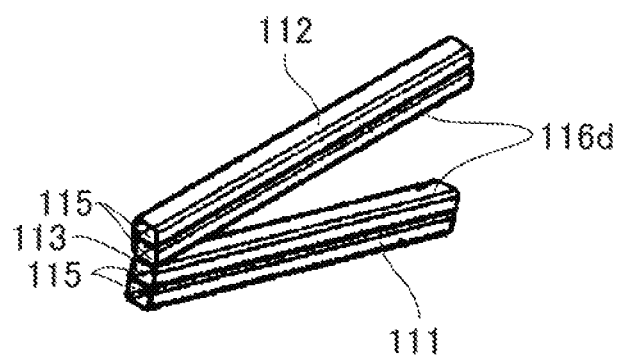

As FIG. 6(B) shows, the connection part 113 is bent so that the respective ends of the first insulating member 111 and the second insulating member 112, opposite the ends near the connection part 113 become close to each other.

Figure 6C:
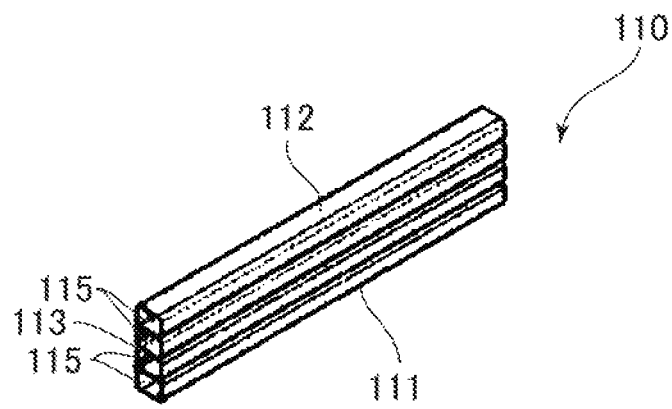

Thereafter, as FIG. 6(C) shows, the connection part 113 is bent at substantially 180° to form the folded-back part so that the respective sides 116d of the first insulating member 111 and the second insulating member 112 are superposed. The connection part 113 may be bent through the pressing process. This makes it possible to form the insulating member 110 having the first insulating member 111 and the second insulating member 112 each with the two coil storage spaces 115 connected with the connection part 113.

Figure 21:
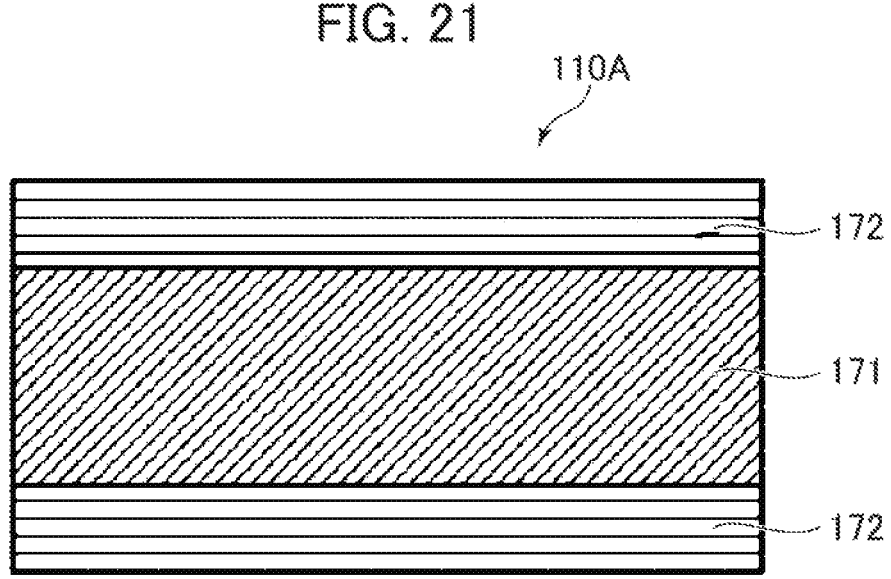
FIG. 21 is a sectional view representing an example of a structure of an insulating paper for forming the insulating member.

FIG. 21 is a sectional view of an exemplary structure of the insulating paper for forming the insulating member.

The insulating paper 110A is formed as a composite material including a resin layer 171, and fiber layers 172 applied onto both surfaces of the resin layer 171 in the thickness direction. For example, the fiber layer 172 may be made of a polyamide fiber, and the resin layer 171 may be made of a polyamide resin that is harder than the fiber layer 172. For example, the insulating paper 110A has its thickness set to be in the range from 0.1 mm to 0.5 mm.

It is possible to use the flexible member such as a PPS (polyphenylene sulfide resin), and a PEEK (polyether ether ketone resin) for forming the insulating paper 110A.

Figure 20:
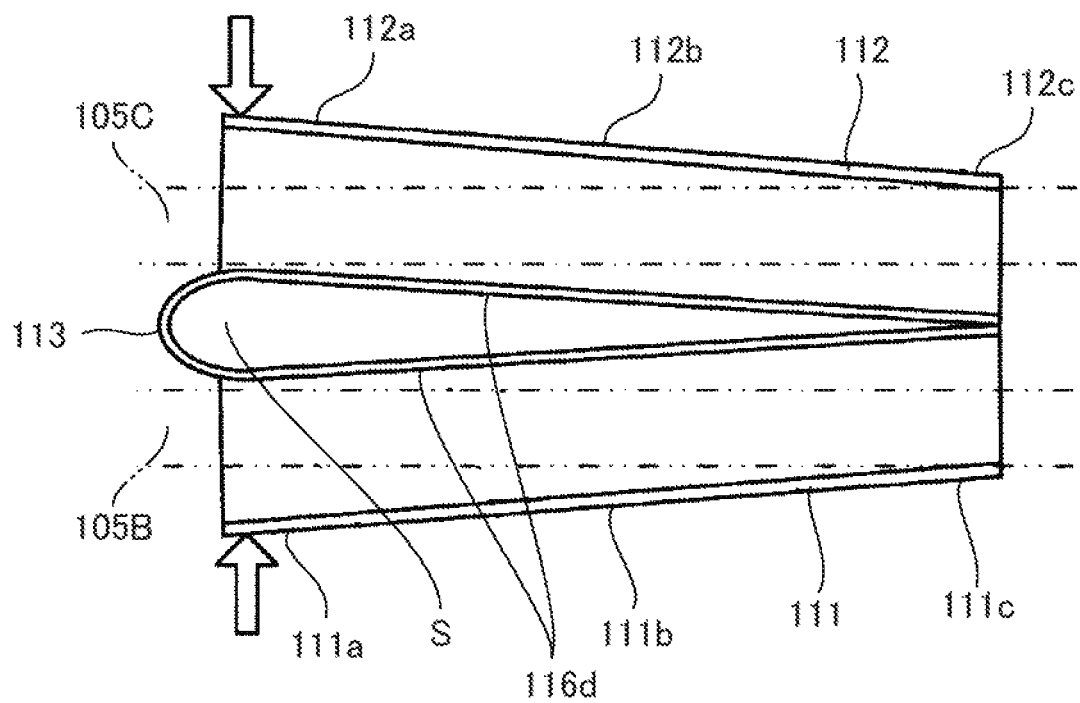
FIG. 20 is a view representing a positional relationship between the insulating member disposed inside the slot of the stator core, and the coil conductor inserted into the insulating member.

FIG. 20 graphically shows the positional relationship between the insulating member disposed inside the slot of the stator core and the coil conductors to be inserted into the insulating member. FIG. 20 shows the length of the insulating member in the thickness direction (radial direction) to be longer than its actual length in an exaggerated manner. FIG. 20 omits the coil storage spaces 115 of the insulating member 110, into which the coil conductors 105A and 105D are inserted.

As described above, the connection part 113 formed between the sides 116d of the insulating member 110 is bent at substantially 180°, in other words, it is folded back. The connection part 113 of the insulating member 110, which has been folded back will be curved so that a space S is generated between confronted surfaces of the folded backsides 116d under the restoring force. In the above-described state, edges 111c, 112c (see FIG. 20) of the first insulating member 111 and the second insulating member 112, opposite the respective ends near the connection part 113 are abutted.

The first insulating member 111 and the second insulating member 112 are inserted into the same slot 103 of the stator core 101. The first insulating member 111 and the second insulating member 112 are inserted into the slot 103 of the stator core 101 while being elastically deformed to make the space S small. In the state where the insulating members are inserted into the slot 103 of the stator core 101, an edge 111a of the first insulating member 111 on the side 111b at the inner circumferential side applies pressure (see FIG. 2) to an inner wall surface 12a of a wall 12 for covering the inner circumferential side of the slot 103 of the stator core 101 under the restoring force of the connection part 113. An edge 112a of the second insulating member 112 on the side 112b at the outer circumferential side applies pressure to a wall surface 13 (see FIG. 2) at the outer circumferential side of the slot 103 of the stator core 101 under the restoring force of the connection part 113. Accordingly, the first insulating member 111 and the second insulating member 112 are held inside the slot 103 of the stator core 101 under the restoring force of the connection part 113.

Even if the coil conductor 105 is brought into contact with the first insulating member 111 or the second insulating member 112 upon insertion of the coil conductor 105 into the coil storage space 115 of the first insulating member 111 or the second insulating member 112, it is possible to suppress positional displacement of the first insulating member 111 or the second insulating member 112, or slipping off from the slot 103 accompanied with movement of the coil conductor 105.

Each size of the coil storage spaces 115 of the insulating member 110 (length in the radial direction×length in the circumferential direction) is set to be slightly larger than the cross sectional area of the coil conductor 105. The coil conductor 105B to be disposed inside the coil storage space 115 of the first insulating member 111 is arranged parallel to the axial direction of a not shown rotary shaft. The side 116d of the first insulating member 111 at the outer circumferential side has the edge 111a near the connection part 113 inner circumferentially tilted to the edge 111c at the side opposite the connection part 113. Then the side 111b of the first insulating member 111 at the inner circumferential side has the edge 111a near the connection part 113 inner circumferentially tilted to the edge 111c at the side opposite the connection part 113. Accordingly, the area of the region where the coil conductor 105B is in contact with a part around the edge 111c of the side 111b of the first insulating member 111 at the inner circumferential side, opposite the connection part 113 is larger than the area of the region where the coil conductor 105B is in contact with a part around the edge 111a of the side 111b near the connection part 113.

Likewise, the side 116d of the second insulating member 112 at the inner circumferential side has the edge 112a near the connection part 113 outer circumferentially tilted to the edge 112c at the side opposite the connection part 113. Then the side 112b of the second insulating member 112 at the outer circumferential side has the edge 112a near the connection part 113 outer circumferentially tilted to the edge 112c at the side opposite the connection part 113. Accordingly, the area of the region where the coil conductor 105C is in contact with a part around the edge 112c of the side 112b of the second insulating member 112 at the outer circumferential side, opposite the connection part 113 is larger than the area of the region where the coil conductor 105C is in contact with a part around the edge 112a near the connection part 113.

In other words, the area of the region where the coil conductor 105 is in contact with either the edge 111c or 112c of the side 111b of the first insulating member 111 or the side 112b of the second insulating member 112, confronting with respect to the connection part 113 is larger than the area of the region where the coil conductor 105 is in contact with the edge 111a or 112a near the connection part 113 at the side opposite the edge 111c or 112c.

The first embodiment as described above provides the following advantageous effects.

(1) The first insulating member 111 and the second insulating member 112 include the sides 116d between the first coil conductor 105B and the second coil conductor 105C, which are superposed along the radial direction of the stator core 101. The side 116d of the first insulating member 111 and the side 116d of the second insulating member 112 are connected with the connection part 113 at one longitudinal edge. When inserting the coil conductors 105B, 105C into the slot 103 of the stator core 101, the first insulating member 111 and the second insulating member 112 of the insulating member 110 may be kept from being positionally displaced or slipped off accompanied with movement of the coil conductors 105B, 105C, resulting in improved operation efficiency.

(2) The insulating member 110 is formed from the single member by integrating the first insulating member 111, the second insulating member 112, and the connection part 113. This makes it possible to form the insulating member 110 efficiently.

(3) As for the area of the region where the coil conductor 105 is in contact with the side 111b of the first insulating member 111 or the side 112b of the second insulating member each confronting the connection part 113, the area of the region at a part around the edge 111c or 112c opposite the edge 111a or 112a near the connection part 113 is larger than the area of the region at a part around the edge 111a or 112a near the connection part 113. The above-described structure may be formed by curving the connection part 113 as the folded-back part so that the space S is formed in the radial direction under the restoring force. The connection part 113 formed into the curved shape serves to apply pressure to the inner wall surface 12a and the wall surface 13 of the slot 103. Accordingly, the first insulating member 111 and the second insulating member 112 are held inside the slot 103 of the stator core 101 under the restoring force of the connection part 113.

(4) The insulating member 110 includes the fiber layer 172 and the resin layer 171 that is harder than the fiber layer 172. The fiber layer 172 is formed between the first coil conductor 105B and the resin layer 171, or between the second coil conductor 105C and the resin layer 171. The above-described structure secures enhanced elastic force and rigidity of the connection part 113.

(5) The insulating member 110 made of such elastic member as the PPS and the PEEK may also provide the similar effects to those as described in (4).

The method of manufacturing the stator for rotary electric machine includes a first step for forming the insulating member 110 with a tubular body for surrounding the first coil conductor 105B and the second coil conductor 105C, and a second step for cutting the insulating member 110 at a midpoint in a longitudinal direction of the tubular body to form a first tubular body surrounding the first coil conductor 105B and a second tubular body surrounding the second coil conductor 105C separately, while being connected with a connection part 113 as a part of the tubular body. The method of manufacturing the stator for rotary electric machine includes a third step for bending the insulating member 110 at the connection part 113 so that radially confronting sides 116d of the first tubular body and the second tubular body of the insulating member 110 are superposed, and a fourth step for disposing the first coil conductor 105B and the second coil conductor 105C in the first tubular body and the second tubular body of the insulating member 110, respectively. This makes it possible to suppress the positional displacement or slipping off of the first insulating member 111 and the second insulating member 112 upon insertion of the coil conductors 105B, 105C into the slot 103 of the stator core 101 accompanied with movement of the coil conductors 105B, 105C. The above-described method allows improvement in the operation efficiency. Furthermore, the curved connection part 113 allows the insulating member 110 to be held inside the slot 103 of the stator core 101 under the restoring force of the connection part 113.

Second Embodiment

A second embodiment of the present invention will be described referring to FIGS. 7 to 9.

Figure 7:
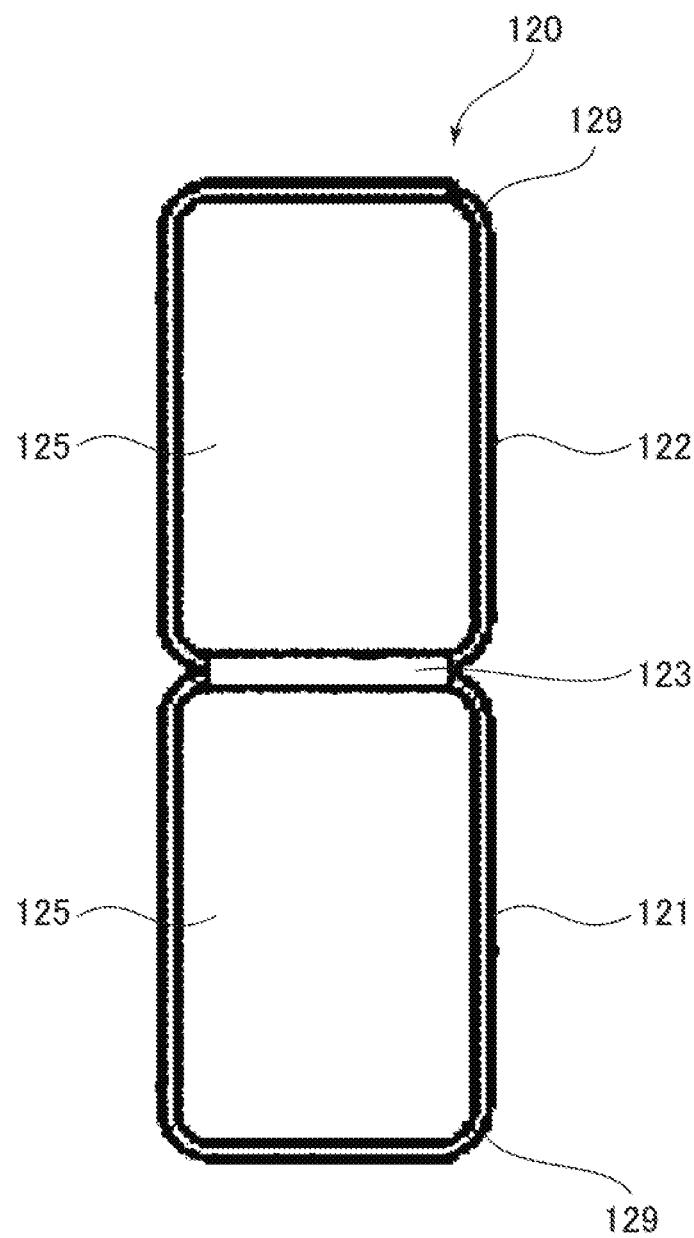
FIG. 7 is a front view of the insulating member as a second embodiment, disposed in the slot of the stator core according to the present invention.

FIG. 7 is a front view of the insulating member as the second embodiment, disposed in the slot of the stator core according to the present invention. FIGS. 8 (A) to 8(D), and 9(A) to 9(C) are perspective views representing the respective steps of the method of manufacturing the insulating member as shown in FIG. 7.

The second embodiment will be described with respect to the point different from the first embodiment.

An insulating member 120 according to the second embodiment includes a first insulating member 121, a second insulating member 122, and a connection part 123 for connecting the first insulating member 121 and the second insulating member 122. Each of the first insulating member 121 and the second insulating member 122 is formed into a tubular shape with O-like or rectangular ring-like cross section. The upper side of the first insulating member 121 and the lower side of the second insulating member 122 are superposed in the radial direction, and are integrally connected at one end with the connection part 123. Like the first embodiment, the first insulating member 121, the second insulating member 122, and the connection part 123 are contiguously and integrally formed from the single sheet of an insulating paper 120A (see FIG. 8 (A)).

Each of the first insulating member 121 and the second insulating member 122 includes one coil storage space 125 for surrounding the coil conductor 105. The two coil storage spaces 125 of the insulating member 120 are arranged superposedly in the radial direction.

The method of manufacturing the insulating member 120 will be described referring to FIGS. 8(A) to 8(D), and 9(A) to 9(C).

Figure 8A:
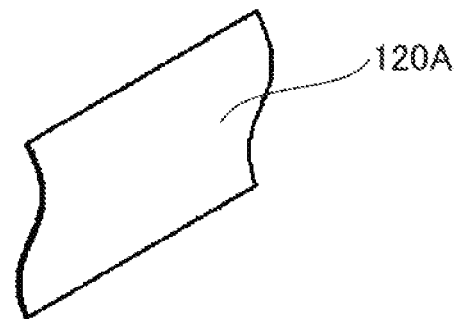
FIGS. 8A to 8D are perspective views representing steps of the method of manufacturing the insulating member as shown in FIG. 7.
Figure 8B:
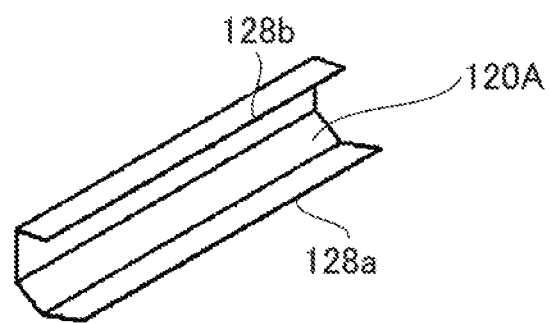
Figure 8C:
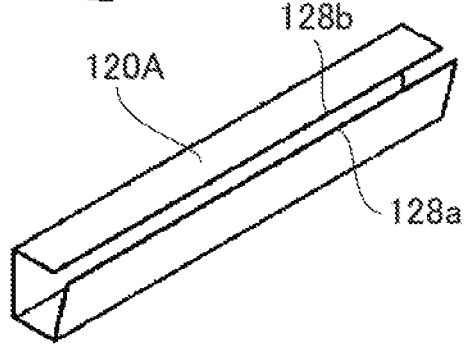
Figure 8D:
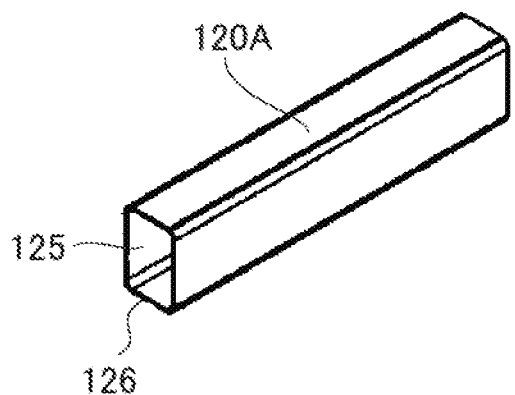

As FIG. 8(A) shows, the single sheet of insulating paper 120A is prepared. As FIGS. 8(B) to 8(D) show, the insulating paper 120A is folded three times parallel to the longitudinal direction to shape the tubular member with O-like or rectangular ring-like cross section. In this embodiment, side edges 128a, 128b of the insulating paper 120A in the width direction confront each other at an O-like or a rectangular ring-like corner portion. As shown in FIG. 7, it is possible to tiltedly fold the paper 120A to form a chamfered corner portion 129 having one and the other side edges abutted on each other in the width direction.

Figure 9A:
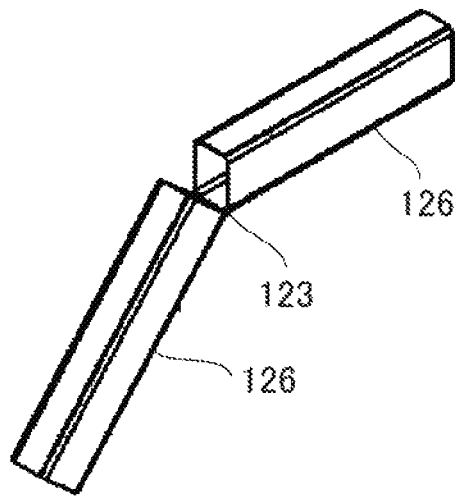
FIGS. 9A to 9C are perspective views of the insulating member in the steps subsequent to those shown in FIG. 8.

The insulating paper 120A is shaped into the tubular body having the coil storage space 125 with O-like or rectangular ring-like cross section as shown in FIG. 8(D). Then all the sides of the thus formed body except the lower side 126 (or upper side) are cut in the width direction at the longitudinal center position as shown in FIG. 9(A). The above-described cutting forms the first insulating member 121 and the second insulating member 122 separately while being connected with the connection part 123.

Figure 9B:
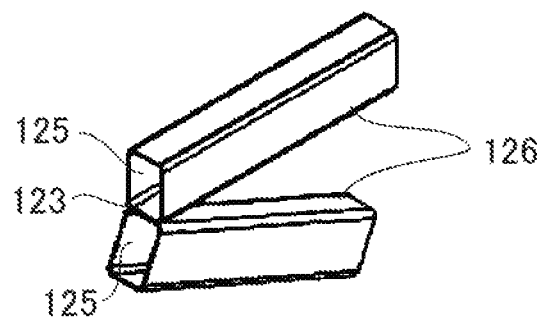

As FIG. 9(B) shows, the connection part 123 is bent so that the respective ends of the first insulating member 121 and the second insulating member, opposite the end at which the connection part 123 is formed become close to each other.

Figure 9C:
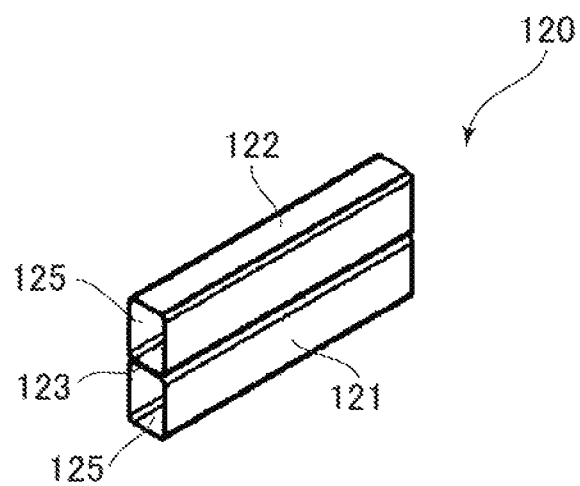

Then as shown in FIG. 9(C), the connection part 123 is bent at substantially 180° to form the folded-back part so that the respective sides 126 of the first insulating member 121 and the second insulating member 122 are superposed, thus forming the insulating member 120 having the first insulating member 121 and the second insulating member 122 each with the single coil storage space 125 connected with the connection part 123.

The advantageous effects similar to those of the first embodiment may be derived from the stator for rotary electric machine using the insulating member 120 according to the second embodiment.

Third Embodiment

A third embodiment according to the present invention will be described referring to FIGS. 10 to 12.

FIG. 10 is a front view of an insulating member as the third embodiment, disposed inside the slot of the stator core according to the present invention. FIGS. 11(A) to 11(D), and 12(A) to 12(C) are perspective views of the insulating member in the respective steps of the method of manufacturing the insulating member as shown in FIG. 10.

The third embodiment will be described with respect to the point different from the first embodiment.

An insulating member 130 according to the third embodiment includes a first insulating member 131, a second insulating member 132, and a connection part 133 for connecting the first insulating member 131 and the second insulating member 132. Each of the first insulating member 131 and the second insulating member 132 is formed into a tubular body with S-like cross section. The upper side of the first insulating member 131 and the lower side of the second insulating member 132 are superposed in the radial direction, and are integrally connected at one end with the connection part 133. Like the first embodiment, the first insulating member 131, the second insulating member 132, and the connection part 133 are contiguously land integrally formed from the single sheet of an insulating paper 130A (see FIG. 11(A)).

Each of the first insulating member 131 and the second insulating member 132 includes two coil storage spaces 135 for surrounding the coil conductors 105. That is, the insulating member 110 includes four coil storage spaces 135 which are arranged superposedly in the radial direction.

The method of manufacturing the insulating member 130 will be described referring to FIGS. 11(A) to 11(D), and 12(A) to 12(C).

Figure 11A:
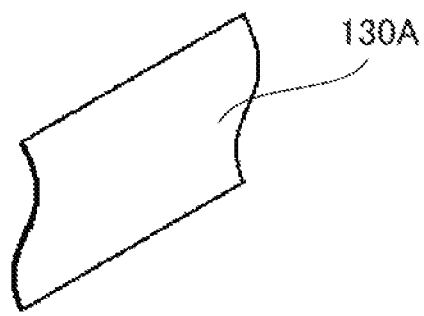
FIGS. 11A to 11D are perspective views representing steps of the method of manufacturing the insulating member as shown in FIG. 10.
Figure 11B:
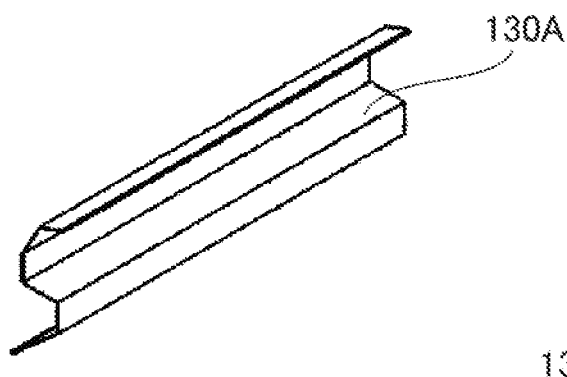
Figure 11C:
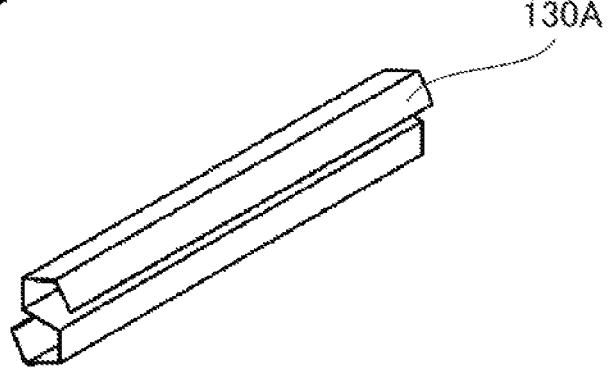
Figure 11D:
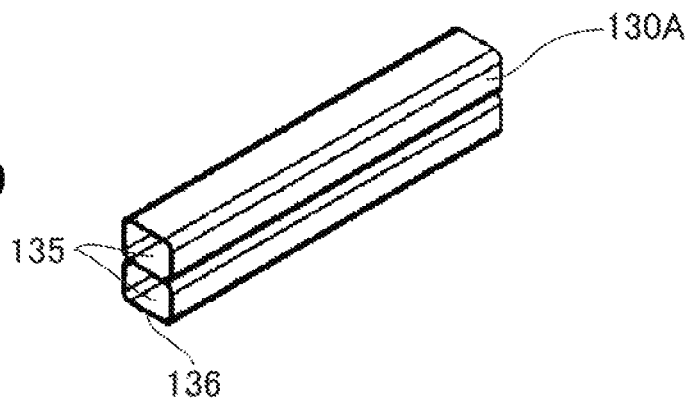
Figure 12A:
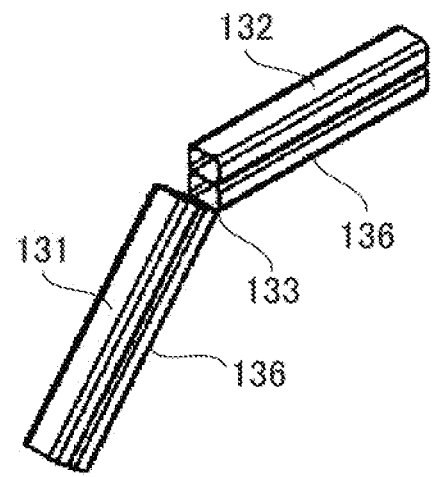
FIGS. 12A to 12C are perspective views of the insulating member in the steps subsequent to those shown in FIG. 11.
Figure 12B:
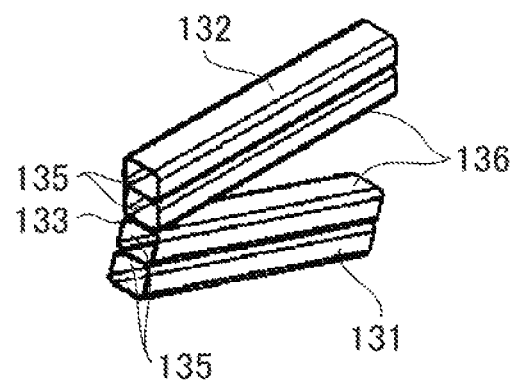

As FIG. 11(A) shows, the single sheet of insulating paper 130A is prepared. As FIGS. 11(B) to 11(D) show, the insulating paper 130A is folded six times parallel to the longitudinal direction to shape the tubular member with S-like cross section. As FIG. 10 shows, it is possible to fold the insulating paper so that tilted corner portions are formed on the side edges at both sides in the width direction.

The insulating paper 130A is shaped into the tubular body with the two coil storage spaces 135 each having S-like cross section as shown in FIG. 11(D). Then all the sides of the thus formed body except the lower side 136 (or upper side) are cut in the width direction at the longitudinal center position. The above-described cutting forms the first insulating member 131 and the second insulating member 132 separately while being connected with the connection part 133.

As FIG. 12 (B) shows, the connection part 133 is bent so that the respective ends of the first insulating member 131 and the second insulating member 132, opposite the ends at which the connection part 133 is formed become close to each other.

Figure 12C:
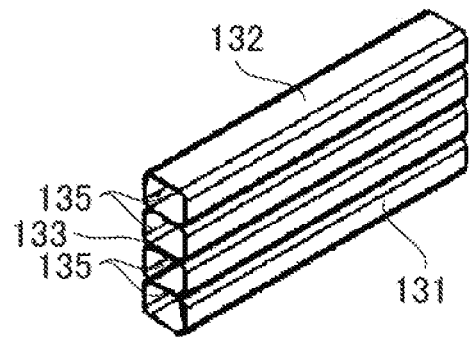

Then as FIG. 12(C) shows, the connection part 133 is bent at substantially 180° to form the folded-back part so that the first insulating member 131 and the second insulating member 132 are superposed on the respective sides 136, thus forming the insulating member 130 having the first insulating member 121 and the second insulating member 122 each with the two coil storage spaces 125 connected with the connection part 133.

The advantageous effects similar to those of the first embodiment may be derived from the stator for rotary electric machine using the insulating member 130 according to the third embodiment.

Fourth Embodiment

FIG. 13 is a front view of an insulating member as a fourth embodiment, disposed inside the slot of the stator core according to the present invention.

The fourth embodiment is different from the first embodiment in the structure of coil storage spaces 145 of the insulating member 140. That is, it is configured to store two coil conductors 105 in each of the four coil storage spaces 145, respectively.

The insulating member 140 according to the fourth embodiment has a first insulating member 141 and a second insulating member 142 each shaped into a tubular body with B-like cross section, which are connected with a connection part 143. Accordingly, the insulating member 140 includes the four coil storage spaces 145 in total. The structure of the fourth embodiment is similar to that of the insulating member 110 according to the first embodiment. However, the insulating member 140 according to the fourth embodiment is large sufficient to allow each of the storage spaces 145 to accommodate the two coil conductors 105 superposedly in the radial direction. The two coil conductors 105 disposed in the same coil storage space 145 constitute the stator winding 102 with the same phase, and is not provided with the insulating material for insulation between the two coil conductors 105 disposed in each of the coil storage spaces 145.

The other structure according to the fourth embodiment is similar to the one according to the first embodiment.

Accordingly, the advantageous effects similar to those of the first embodiment may be derived from the stator for rotary electric machine using the insulating member 140 according to the fourth embodiment.

Fifth Embodiment

A fifth embodiment according to the present invention will be described referring to FIGS. 14 to 16.

FIG. 14 is a front view of an insulating member as the fifth embodiment, disposed inside the slot of the stator core according to the present invention. FIGS. 15(A) to 15(D), and 16(A) to 16(C) are perspective views of the insulating member in the respective steps of the method of manufacturing the insulating member as shown in FIG. 14.

Figure 16A:
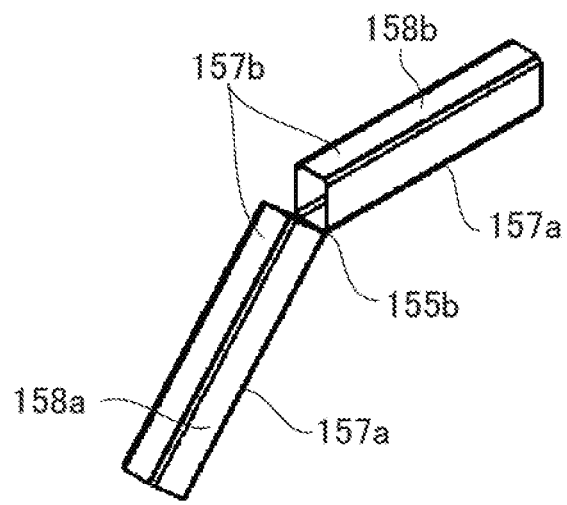
FIGS. 16A to 16C are perspective views of the insulating member in the steps subsequent to those shown in FIG. 15.

An insulating member 150 according to the fifth embodiment includes a plurality of tubular members each with O-like or rectangular ring-like cross section like the insulating member 120 according to the second embodiment. However, the insulating member 150 according to the fifth embodiment includes four tubular members more than those of the second insulating member 120 according to the second embodiment. That is, as FIG. 16(C) shows, the insulating member 150 includes the first to the fourth insulating members 151 to 154 so that four coil storage spaces 156 are superposedly arranged in the radial direction.

A first insulating member 151 and a second insulating member 152 are connected with a connection part 155a atone longitudinal end. The second insulating member 152 and a third insulating member 153 are connected with a connection part 155b (see FIG. 16(C)) at an end opposite the longitudinal end. The third insulating member 153 and a fourth insulating member 154 are connected with a connection part 155c at the one longitudinal end.

Specifically, the insulating member 150 is formed by connecting the respective folded-back tubular members with the connection parts 155a to 155c at one and the other ends alternately in zigzags.

The method of manufacturing the insulating member 150 will be described referring to FIGS. 15(A) to 15(D), and 16(A) to 16(C).

Figure 15A:
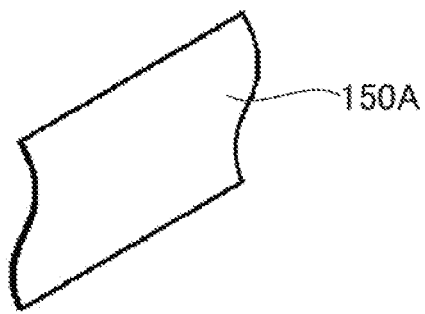
FIGS. 15A to 15D are perspective views representing steps of the method of manufacturing the insulating member as shown in FIG. 14.
Figure 15B:
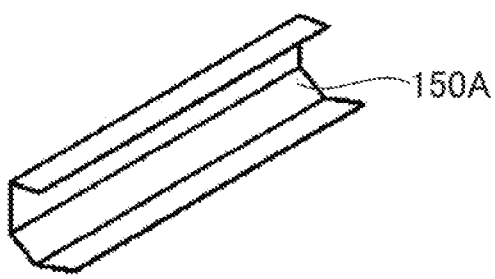
Figure 15C:
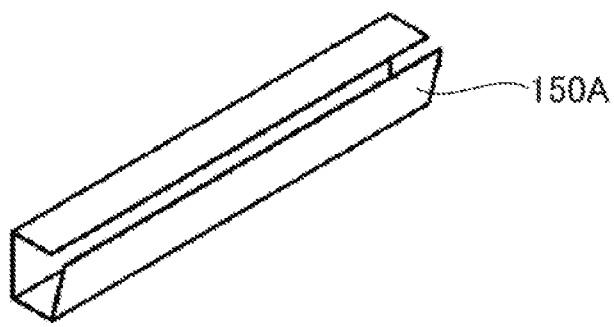

As FIG. 15(A) shows, the single sheet of insulating paper 150A is prepared. As FIGS. 15(B) to 15(D) show, the insulating paper 150A is folded parallel to the longitudinal direction to shape the tubular member with O-like or rectangular ring-like cross section.

Figure 15D:
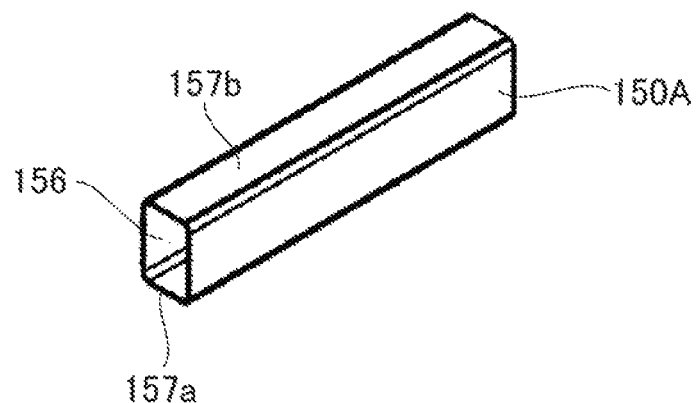

The insulating paper 150A is formed into the tubular member having a coil storage space 156 with O-like or rectangular ring-like cross section as shown in FIG. 15(D). Then all the sides of the thus formed member except the lower side 157a are cut in the width direction at the longitudinal center position. The above-described cutting forms the two separate tubular members 158a, 158b while being connected with the connection part 155b.

Figure 16B:
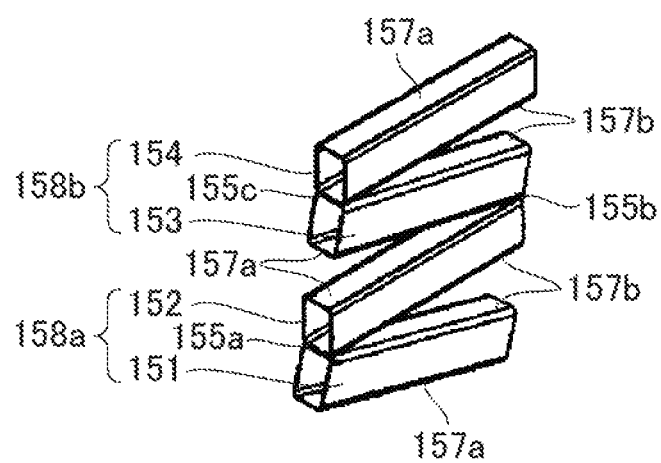
Figure 16C:
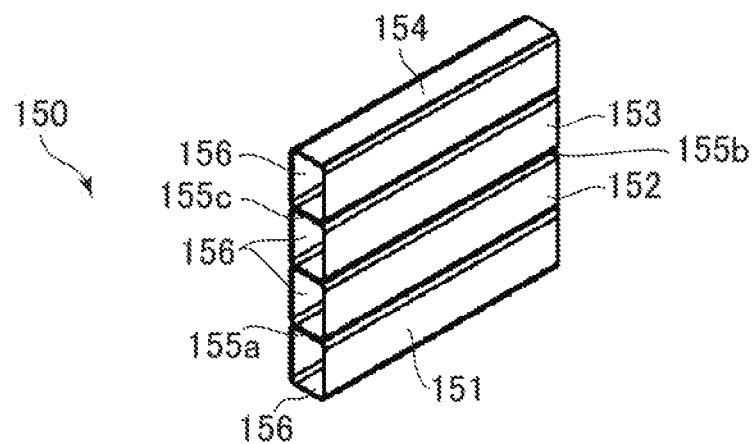

As FIG. 16(B) shows, all the sides of the two separate tubular members 158a, 158b except the upper sides 157b are cut in the width direction at the longitudinal center position. The above-described cutting separately forms the first insulating member 151 and the second insulating member 152 while being connected with the connection part 155a. Furthermore, the third insulating member 153 and the fourth insulating member 154 are also separately formed while being connected with the connection part 155c. In other words, the tubular member is shaped by connecting the first to the fourth insulating members 151 to 154 with the connection parts 155a to 155c, respectively.

Each of the connection parts 155a to 155c is bent at substantially 180° to form the folded-back part, thus forming the insulating member 150 having the first to the fourth insulating members 151 to 154 each having the single coil storage space 156 with O-like or rectangular ring-like cross section connected with the connection parts 155a to 155c, respectively as shown in FIG. 16(C).

The advantageous effects similar to those of the first and the second embodiments may be derived from the stator for rotary electric machine using the insulating member 150 according to the fifth embodiment.

It is possible to increase the number of the coil storage spaces 156 of the insulating member 150 according to the fifth embodiment so as to be more than the coil storage spaces of the insulating member 120 according to the second embodiment.

Sixth Embodiment

FIG. 17 is a perspective view of an insulating member as a sixth embodiment, disposed in the slot of the stator core according to the present invention.

An insulating member 160 according to the sixth embodiment includes three tubular members which are more than those of the insulating member 110 according to the first embodiment. Specifically, the insulating member 160 includes first to third insulating members 161 to 163. Each of the insulating members 161 to 163 is shaped into a tubular body with B-like cross section, and includes two coil storage spaces 165. Consequently, the insulating member 160 includes six coil storage spaces 165.

The first insulating member 161 and the second insulating member 162 are folded back at a connection part 164a at one longitudinal end. The second insulating member 162 and the third insulating member 163 are folded back at a connection part 164b at the other longitudinal end.

The insulating member 160 according to the sixth embodiment may be formed by the method similar to the one for forming the insulating member 150 according to the fifth embodiment.

The advantageous effects similar to those of the first embodiment may be derived from the stator for rotary electric machine using the insulating member 160 according to the sixth embodiment.

It is possible to increase the number of the coil storage spaces 165 of the insulating member 160 according to the sixth embodiment so as to be more than the coil storage spaces of the insulating member 110 according to the first embodiment.

Furthermore, in the sixth embodiment, it is possible to set the number of the tubular members of the insulating member 160 to four or more. Like the insulating member 160 having the tubular member with B-like cross section, the insulating member 130 according to the third embodiment, having the tubular member with S-like cross section may be configured to include three or more tubular members.

Seventh Embodiment

The insulating members 110 to 160 may be formed by the method different from the one as described above. Another method of manufacturing the insulating member will be described, taking the insulating member 110 as an example.

FIGS. 18(A) to 18(C), and FIGS. 19(A) to 19(C) are perspective views representing the respective steps of another method of manufacturing the insulating member to be disposed inside the slot of the stator core.

Figure 18A:
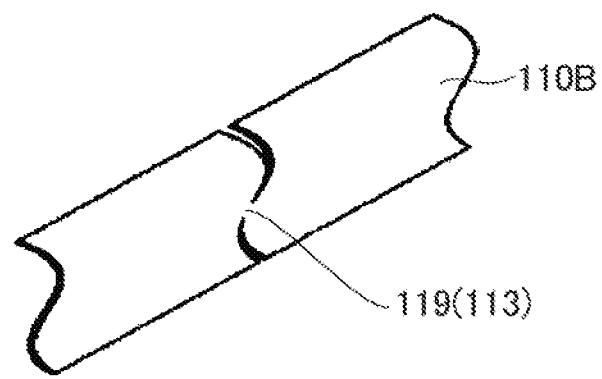
FIGS. 18A to 18C are perspective views of the insulating member in the respective steps.

As FIG. 18(A) shows, the single sheet of insulating paper 110B is prepared, and cut at a longitudinal center position in the width direction while leaving a center region 119 from the respective side edges. The insulating paper 110B is divided into a first tubular forming region 118a and a second tubular forming region 118b while being connected at the center region 119. The center region 119 is expected to be the connection part 113 for connecting the first insulating member 111 and the second insulating member 112 in a finished state. The size of the uncut center region 119 in the width direction is equal to or smaller than that of the side 116d in the width direction as shown in FIG. 6(B) and the like.

Figure 18B:
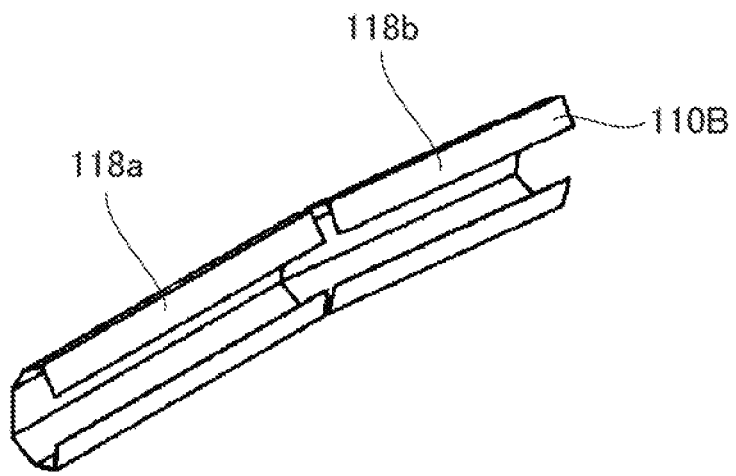
Figure 18C:
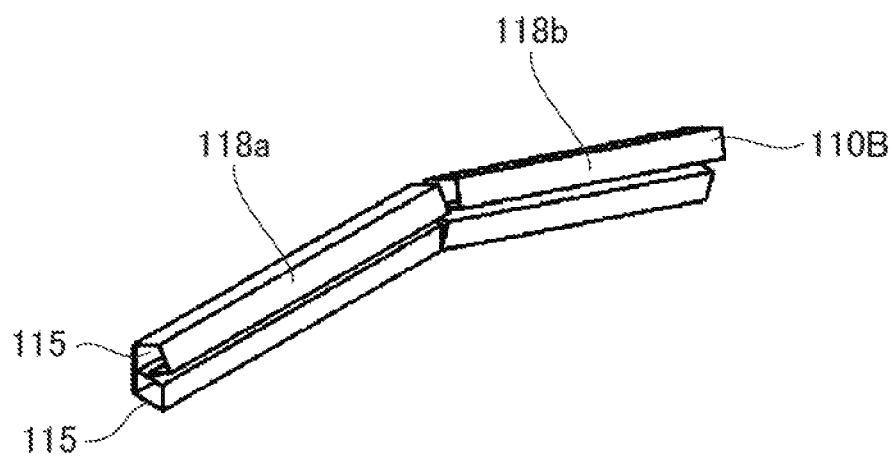

Referring to FIGS. 18(B) and 18(C), each of the first tubular forming region 118a and the second tubular forming region 118b is folded parallel to the longitudinal direction so as to shape the tubular member with B-like cross section, which includes two coil storage spaces 115.

Figure 19A:
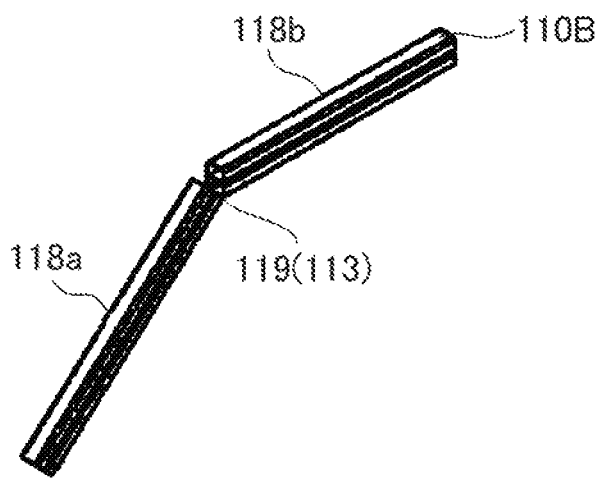
FIGS. 19A to 19C are perspective views of the insulating member in the steps subsequent to those shown in FIG. 18.
Figure 19B:
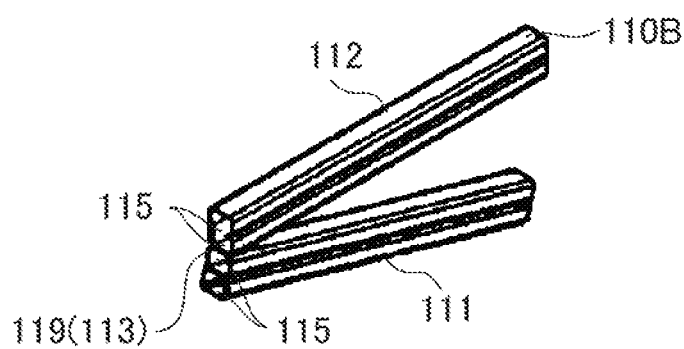

Each of the first tubular forming region 118a and the second tubular forming region 118b is formed into the tubular body with B-like cross section. Then the center region 119 is bent so that the respective ends of the tubular members, opposite those at which the center region 119 is formed become close to each other as shown in FIGS. 19(A), 19(B). As a result, the first tubular forming region 118a and the second tubular forming region 118b are folded back at the center region 119 to form the first insulating member 111 and the second insulating member 112 each having the two coil storage spaces 115 as shown in FIG. 19(B).

Figure 19C:
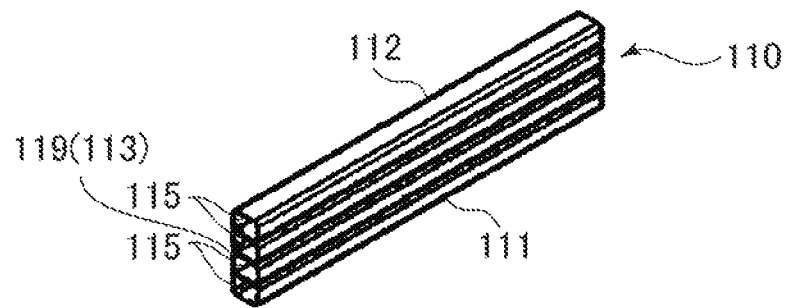

Thereafter, as FIG. 19(C) shows, the center region 119 is bent at substantially 180° to form the folded-back part so that the respective sides 116d of the first insulating member 111 and the second insulating member 112 are superposed, thus forming the insulating member 110 having the first insulating member 111 and the second insulating member 112 each with the two coil storage spaces 115 connected with the connection part 113.

As exemplified by the first embodiment, the first insulating member 111, the second insulating member 112, and the connection part 113 are integrally formed from the single sheet of insulating paper 110A. It is also possible to shape the first insulating member 111 and the second insulating member 112 separately so that only one of those insulating members includes the connection part 113 which is bonded to the other insulating member through welding or adhesion. Alternatively, it is possible to shape the first insulating member 111 and the second insulating member 112 separately, each of which includes the connection part 113 so as to be bonded through welding or adhesion.

In the respective embodiments, the width of the connection part 113 of the insulating member 110 or the like is set to be equivalent to that of the side 116d. It is also possible to set the width of the connection part 113 of the insulating member 110 or the like to be smaller than the width of the side 116d.

In the respective embodiments, the coil conductor 105 is exemplified as having the rectangular cross section. However, it is also possible to use the coil conductor having circular cross section. In such a case, the coil storage space 115 or the like may have the circular cross section. If the coil storage space 115 or the like is formed to have the circular cross section, it is possible to form only the connection part 113 to have the flat shape.

Various kinds of embodiments and modified examples have been described. However, the present invention is not limited to those described above, which may include any other embodiments so long as they are within the scope of the present invention.

LIST OF REFERENCE SIGNS 100 stator
101 stator core
102 stator winding
103, 103a, 103b slot
105 coil conductor
105A coil conductor (third coil)
105B coil conductor (first coil)
105C coil conductor (second coil)
105D coil conductor (fourth coil)
110, 120, 130, 140, 150, 160 insulating member
111, 121, 131, 141, 151, 161 first insulating member (first tubular body)
111b, 112b side (counter side)
112, 122, 132, 142, 152, 162 second insulating member (second tubular body)
113, 123, 133, 143, 155a, 164a connection part (first connection part)
116a to 116c side
116d, 126 side (one side)
118a first tubular forming region
118b second tubular forming region
119 center region (connection part)
153, 163 third insulating member
154 fourth insulating member
155b, 164b connection part (second connection part)
155c connection part
171 resin layer
172 fiber layer

The invention claimed is:

1. A stator for rotary electric machine comprising:
a stator core which includes a plurality of slots;
a first coil and a second coil which are arranged inside the same slot along a radial direction of the stator core;
an insulating member which is stored inside the slot for insulation between the first coil and the second coil, wherein
the insulating member includes a first insulating member which surrounds the first coil, and a second insulating member which surrounds the second coil,
each of the first insulating member and the second insulating member has one side which is disposed between the first coil and the second coil, and both the one sides are superposed along the radial direction of the stator core, and
the one side of the first insulating member and the one side of the second insulating member are connected with a first connection part at one edge in a longitudinal direction; and
a third coil which is disposed adjacent to the second coil inside the same slot along the radial direction of the stator core, wherein
the insulating member further includes a third insulating member which surrounds the third coil,
the third insulating member has one side which is disposed between the second coil and the third coil, and superposed along the radial direction of the stator core, and
the one side of the second insulating member and the one side of the third insulating member are connected with a second connection part at the other edge of the second insulating member, opposite the one edge.

2. The stator for rotary electric machine according to claim 1,
wherein the first insulating member, the second insulating member, and the first connection part of the insulating member are integrally formed from one member.

3. The stator for rotary electric machine according to claim 1,
wherein each of the first insulating member and the second insulating member is formed into a tubular body having substantially an O-like, a B-like, or an S-like cross section.

4. The stator for rotary electric machine according to claim 1,
wherein the first insulating member includes a counter side confronting the one side; and
at a part near the other edge opposite the one edge of the first insulating member, an area of a region where the counter side is in contact with the first coil is larger than an area of a region where the one side is in contact with the first coil.

5. The stator for rotary electric machine according to claim 1, further comprising a third coil disposed adjacent to the first coil, and a fourth coil disposed adjacent to the second coil, both of which are provided inside the same slot along the radial direction of the stator core,
wherein the first insulating member includes a second side for insulation between the first coil and the third coil; and
the second insulating member includes a third side for insulation between the second coil and the fourth coil.

6. The stator for rotary electric machine according to claim 1,
wherein the insulating member includes a fiber layer and a resin layer harder than the fiber layer; and
the fiber layer is interposed between the first coil and the resin layer, or between the second coil and the resin layer.

7. The stator for rotary electric machine according to claim 1,
wherein the insulating member is made of a flexible resin material.

8. A rotary electric machine comprising:
the stator for rotary electric machine according to claim 1; and
a rotor.

9. A manufacturing method of stator for rotary electric machine, the stator for rotary electric machine including a first coil and a second coil which are arranged inside a same slot of a stator core along a radial direction of the stator core, and an insulating member which is stored inside the slot for insulation between the first coil and the second coil, the manufacturing method comprising:
- a first step for forming the insulating member with a tubular body for surrounding the first coil and the second coil;
- a second step for cutting the insulating member at a midpoint in a longitudinal direction of the tubular body to form a first tubular body surrounding the first coil and a second tubular body surrounding the second coil separately, while being connected with a connection part as a part of the tubular body;
- a third step for bending the insulating member at the connection part so that radially confronting sides of the first tubular body and the second tubular body of the insulating member are superposed; and
- a fourth step for disposing the first coil and the second coil in the first tubular body and the second tubular body of the insulating member, respectively.

10. A manufacturing method of stator for rotary electric machine, the stator for rotary electric machine including a first coil and a second coil which are arranged inside a same slot of a stator core along a radial direction of the stator core, and an insulating member which is stored inside the slot for insulation between the first coil and the second coil, the manufacturing method comprising:
- a first step for cutting the insulating member at a midpoint in a longitudinal direction to form a first tubular forming region surrounding the first coil and a second tubular forming region surrounding the second coil separately, while being connected with a connection part as a part of the insulating member;
- a second step for forming the first tubular forming region and the second tubular forming region of the insulating member into a first tubular body surrounding the first coil and a second tubular body surrounding the second coil, respectively;
- a third step for bending the insulating member at the connection part so that mutually confronting sides of the first tubular body and the second tubular body of the insulating member are superposed; and
- a fourth step for disposing the first coil and the second coil in the first tubular body and the second tubular body of the insulating member, respectively.

\* \* \* \* \*